United States Patent
Hartman et al.

(10) Patent No.: US 8,251,612 B2
(45) Date of Patent: Aug. 28, 2012

(54) TIDAL RESPONSIVE BARRIER

(75) Inventors: Craig W. Hartman, Corte Madera, CA (US); Mark P. Sarkisian, San Anselmo, CA (US)

(73) Assignee: Skidmore, Owings & Merrill LLP, New York, NY (US)

( * ) Notice: Subject to any disclaimer, the term of this patent is extended or adjusted under 35 U.S.C. 154(b) by 132 days.

(21) Appl. No.: 12/541,535

(22) Filed: Aug. 14, 2009

(65) Prior Publication Data

US 2011/0038671 A1    Feb. 17, 2011

(51) Int. Cl.
E02B 3/04    (2006.01)

(52) U.S. Cl. ............................................. 405/68; 405/64

(58) Field of Classification Search .............. 405/60, 405/63, 64, 65, 66, 67, 68, 69, 72
See application file for complete search history.

(56) References Cited

U.S. PATENT DOCUMENTS

| | | | | |
|---|---|---|---|---|
| 2,391,059 A | * | 12/1945 | MacFarren | 405/52 |
| 2,511,705 A | | 6/1950 | Fletcher et al. | |
| 3,691,773 A | * | 9/1972 | Ruhlman | 405/70 |
| 3,798,911 A | | 3/1974 | Oberg | |
| 3,984,987 A | * | 10/1976 | Light, Jr. | 405/63 |
| 4,048,802 A | | 9/1977 | Bowley | |
| 4,104,884 A | * | 8/1978 | Preus | 405/68 |
| 4,201,495 A | * | 5/1980 | Preus | 405/63 |
| 4,252,461 A | * | 2/1981 | Colamussi et al. | 405/64 |
| 4,280,438 A | * | 7/1981 | Jackson | 405/64 |
| 4,282,822 A | * | 8/1981 | Jackson | 405/64 |
| 4,320,991 A | | 3/1982 | Rogers | |
| 4,464,080 A | | 8/1984 | Gorlov | |
| 4,498,810 A | | 2/1985 | Muramatsu et al. | |
| 4,594,853 A | | 6/1986 | Raichlen et al. | |
| 4,688,024 A | * | 8/1987 | Gadde | 405/63 |
| 4,791,410 A | * | 12/1988 | Larsson | 340/550 |
| 5,154,537 A | * | 10/1992 | DeVries et al. | 405/63 |
| 5,385,427 A | | 1/1995 | Kateley et al. | |

(Continued)

FOREIGN PATENT DOCUMENTS

DE    19807640    9/1998

(Continued)

OTHER PUBLICATIONS

International Search Report corresponding to PCT/US10/45268 dated Oct. 6, 2010.

*Primary Examiner* — Frederick L Lagman
(74) *Attorney, Agent, or Firm* — SNR Denton US LLP (57) ABSTRACT

A tidal barrier is provided that may be selectively deployed in response to tidal changes. The tidal barrier includes a net having a tensile membrane with an upper edge and a lower edge. The lower edge has a plurality of anchor points for affixing the lower edge to a seabed below a body of water. The tidal barrier further includes a bladder affixed to the upper edge and having a valve for selectively inflating and deflating the bladder. The bladder has a sufficient volume to cause the upper edge of the membrane to rise to a surface of the body of water when the volume is inflated with a gas. A pump is disposed in proximity to the tensile membrane and is in fluid communication with the valve of the bladder. The pump has a controller for selectively prompting the pump to inflate and deflate the bladder with the gas.

25 Claims, 9 Drawing Sheets

U.S. PATENT DOCUMENTS

| | | | |
|---|---|---|---|
| 5,702,203 | A | 12/1997 | Resio et al. |
| 5,785,455 | A | 7/1998 | Eaker |
| 5,827,011 | A | 10/1998 | Kann |
| 5,871,305 | A * | 2/1999 | Allen .................... 405/63 |
| 6,568,878 | B2 | 5/2003 | Woodall et al. |
| 6,847,326 | B2 | 1/2005 | Harigae et al. |
| 6,960,047 | B2 | 11/2005 | Knezek |
| 6,967,413 | B2 | 11/2005 | Atiya |
| 7,134,807 | B2 * | 11/2006 | Dreyer .................... 405/64 |
| 7,524,140 | B2 | 4/2009 | Bishop |
| 2003/0044233 | A1 | 3/2003 | Hillard et al. |
| 2004/0219039 | A1 | 11/2004 | Watt |
| 2005/0036839 | A1 | 2/2005 | Hillard et al. |
| 2005/0099010 | A1 | 5/2005 | Hirsch |
| 2005/0271470 | A1 | 12/2005 | Rytand |

FOREIGN PATENT DOCUMENTS

| | | |
|---|---|---|
| WO | WO0136751 | 5/2001 |

* cited by examiner

TIDAL RESPONSIVE BARRIER

BACKGROUND OF THE INVENTION

The present invention relates to apparatuses and methods for protecting shorelines or urban areas along waterways against periodic high water levels associated with tidal surges or high level floodwaters. More particularly, the present invention relates to a tidal responsive barrier that includes a collapsible high-strength tensile membrane anchored at a bottom end to a sea or river bed and having bladders in a top end of the membrane, where the bladders may be selectively inflated to cause the leading edge of the membrane to rise to the surface of the sea or rive water (e.g., in response to a tidal change) such that the membrane stretches from the sea or river bed to the water surface and to water's edge where the membrane is anchored to structural pylons.

The principle threat of flooding in the next century is not necessarily from the rise in the sea level itself, but from the increase in extremes during high tides and storms which create breaches of existing flood defenses for relatively brief periods. Permanent levees, jetties or groins have been previously employed to protect shorelines and offer some protection against such periodic extremes in high tides or storms; however, these devices typically comprise concrete blocks, rip-rap or other heavy weighted, fortifying materials that are permanent structures that do not enable passage of marine vehicles, inhibit natural marine ecosystems, inhibit full enjoyment of the region of the shoreline and are expensive to build and deploy.

One prior art groin structure that utilizes a floating mesh net secured to a seabed for protecting a shore line is described in US Publication No. US 2005/0036839. This prior art groin structure employs floatation supports such as air filled bladders, polyethylene floats or other materials to stretch the mesh net between the seabed and a low tide level 36. At high tide levels the mesh net of the groin structure is completely immersed in the water and, thus, not capable of effectively inhibiting periodic extreme tidal changes or surges from flooding the shoreline. Moreover, the disclosed prior art groin structure is disclosed as being permanently deployed, which presents similar problems for inhibiting passage of marine vehicles, marine life, and the full enjoyment of the region of the shoreline where the groin structure is deployed.

Thus, there is a need for a tidal barrier that overcomes the problems noted above and is responsive to periodic high water levels associated with tidal surges or high level floodwaters to protect shorelines or urban areas along waterways from such periodic high water levels.

SUMMARY OF THE INVENTION

Apparatuses, systems and methods consistent with the present invention provide a tidal responsive barrier that is lightweight and environmentally sensitive system designed to protect urbanized areas bordering inland waterways from periodic high water levels associated with tidal surges or high level floodwaters. The tidal responsive barrier operates on organic principles of buoyancy and the structural efficiency associated with tensile net membranes. A tidal responsive barrier consistent with the present invention may be manufactured and implemented in a local water way at substantially less cost than permanent levees and localized flood protection structures without compromising ecology and commerce of these water areas.

In accordance with apparatus consistent with the present invention, a tidal barrier provided that is responsive to tidal changes. The tidal barrier comprises a net having a tensile membrane. The tensile membrane has an upper edge and a lower edge. The lower edge has a plurality of anchor points for affixing the lower edge to a seabed below a body of water. The tidal barrier also includes a bladder affixed to the upper edge and having a valve for selectively inflating and deflating the bladder. The bladder has a sufficient volume to cause the upper edge of the membrane to rise to a surface of the body of water when the volume is inflated with a gas. The tidal barrier further includes a pump disposed in proximity to the tensile membrane and in fluid communication with the valve of the bladder. The pump has a controller for selectively prompting the pump to inflate and deflate the bladder with the gas.

In one implementation, the tidal barrier net further comprises a plurality of interior cables that extend between the lower edge and the upper edge of the tensile membrane so that the interior cables reinforce the tensile strength of the tensile membrane when the volume of the bladder is inflated and the upper edge of the membrane is correspondingly caused to rise to the surface of the body of water.

The tidal barrier may also include a plurality of pylons, each of which is anchored relative to the seabed and extending a predetermined height above the surface of the body of water when the body of water is at a predetermined depth. In this implementation, the tidal barrier net further comprises a top cable affixed to and running a length of the upper edge of the tensile membrane. The top cable has one end attached to one pylon and another end attached to another pylon so that, when the volume of the bladder is inflated and the upper edge of the membrane is correspondingly caused to rise to the surface of the body of water, the upper edge of the tensile membrane extends from the one pylon to other pylon in an arc defined by a current of the body of water. In this implementation, when the water level of the body of water on one side of the net rises with the current, the upper edge of the tensile membrane correspondingly rises causing the tensile membrane to form a catenary arc in the direction of the current such that the rise in water level is inhibited from passing beyond the one side of the net.

In another implementation, the tidal barrier may further comprise a tank in fluid communication between the pump and the valve of the bladder. In this implementation, the pump is adapted to pump an amount of gas for inflating the volume of the bladder into the tank for storage. The tank has an output valve adapted to release the stored amount of gas to the bladder in response to an input.

In another implementation, the pump may include a piston adapted to compress air (as the gas) to the tank when the piston is actuated and a floatation device disposed in the body of water where the tidal barrier is disposed. The floatation device is connected to the piston such that the floatation device actuates the piston in response to tidal changes in the level of the body of water.

In another implementation, the tidal barrier may include an electromagnetic floatation generator for powering the pump. The electromagnetic floatation generator includes: an internal chamber housing a conductive coil having an end electrically connected to the pump; a floatation system having a floatation assembly that floats on the surface of the body of water; an external chamber connected to the floatation system such that the floatation system causes the external chamber to fluctuate up and down in response to wave action in the body of water where the generator is disposed; and a permanent magnet disposed on an interior wall of the external chamber. The external chamber encases and moves relative to at least a portion of the internal chamber housing the coil so that at least a portion of the coil effectively moves within a magnetic field produced by the magnet as the external chamber fluctuates up and down in response to wave action in the body of water to generate a current in the coil for powering the pump.

In another implementation, the pump may be connected to and powered by a solar generator or wind turbine disposed at or above the surface of the body of water where the tidal barrier is disposed.

In another implementation, the tidal barrier may include a continuous concrete footing system disposed along the seabed to anchor and substantially seal the lower edge of the tensile membrane along the sea bed floor.

In another implementation, the tidal barrier further comprises a measurement buoy tank operatively configured to float on the surface of the water at a predetermined distance from the tidal barrier net for monitoring high tide levels. The measurement buoy tank includes a tidal elevation sensor operatively configured to sense and output a tidal level change; a wireless transmitter; and a controller operatively connected to the sensor and the wireless transmitter. The controller is programmed to receive the tidal level change output from the sensor, determine whether the output exceeds a predetermined threshold, and transmit an alarm signal, via the wireless transmitter, when the predetermined threshold is exceeded. In this implementation, the pump includes a wireless receiver that is operatively configured to receive the alarm signal from the transmitter and output a corresponding alarm signal to the pump controller. In response to receiving the corresponding alarm signal, the pump controller activates the pump to inflate the bladder. The pump may also include a marine vessel warning system and the pump controller activates the marine vessel warning system to signal immanent deployment of the tidal barrier in response to receiving the corresponding alarm signal from the wireless receiver.

In another implementation, the bladder is one of a plurality of bladders, each of which is affixed along the upper edge of the tensile membrane. Each bladder has a respective volume to collectively cause the upper edge of the membrane to rise to a surface of the body of water when the volume of each bladder is inflated with a gas. In this implementation, the tidal barrier further comprises a manifold and a storage tank. The manifold has an input and a plurality of outputs. Each manifold output is in fluid communication with a respective one of the bladders, for example, via respective flexible piping. The tank is in fluid communication (e.g., via a flexible pipe) between the pump of the tidal barrier and the manifold input. In this implementation, the pump is adapted to pump an amount of gas for inflating the volume of each bladder into the tank for storage, and the tank has an output valve adapted to release the stored amount of gas to the bladders via the manifold in response to an input.

In each implementation, the valve of the bladder may have a control input for controlling the opening of the valve, and the pump controller may be operatively connected to the control input to open the valve to deflate the bladder in response to an input signal reflecting that a threat of a tidal change in the body of water has passed. When the bladder is deflated at least a portion of the upper edge of the tensile membrane drops to rest on the seabed.

Other apparatus, systems, methods, features, and advantages of the present invention will be or will become apparent to one with skill in the art upon examination of the following figures and detailed description. It is intended that all such additional methods, systems, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

The principle threat of flooding in the next century is not necessarily from the rise in the sea level itself, but from the increase in extremes during high tides and storms which create breaches of existing flood defenses for relatively brief periods. A tidal responsive barrier consistent with the present invention is operatively configured to prevent the peak of extreme tide events while maintaining a natural tidal exchange between oceans and inland waterways.

Figure 1A:
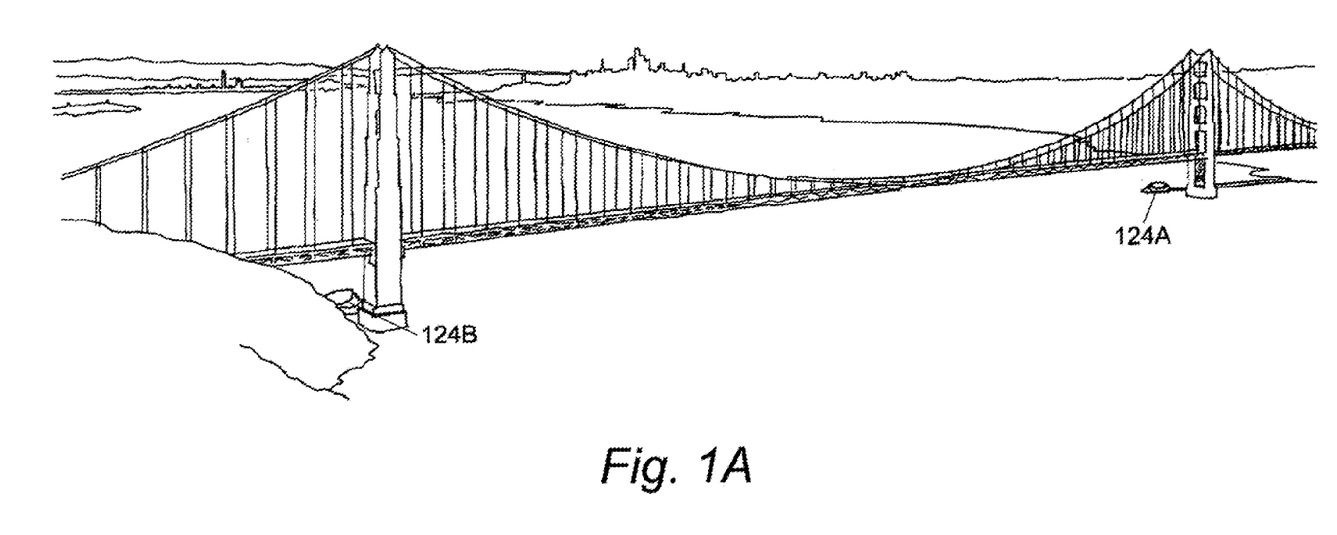
FIG. 1A is a perspective view of an exemplary tidal barrier consistent with the present invention, where the tidal barrier is shown in an non-deployed state.
Figure 1B:
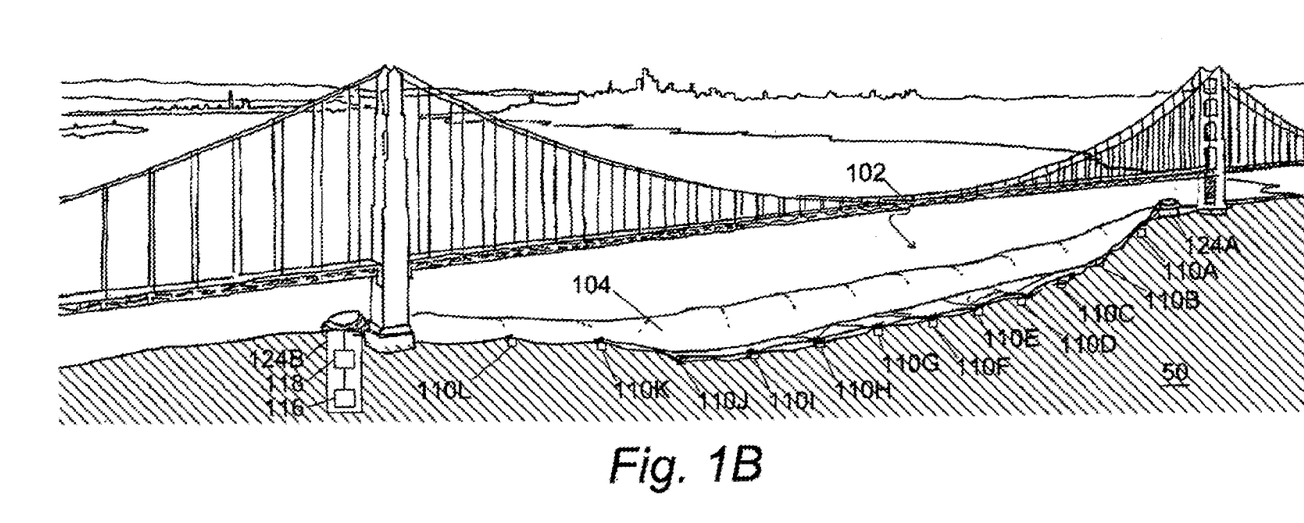
FIG. 1B is another perspective view of the tidal barrier as depicted in FIG. 1, where a portion of the tidal barrier of FIG. 1 comprising a high-strength tensile membrane is shown in the non-deployed state in accordance with the present invention, resting on the seabed in the body of water in which the tidal barrier is installed.
Figure 2:
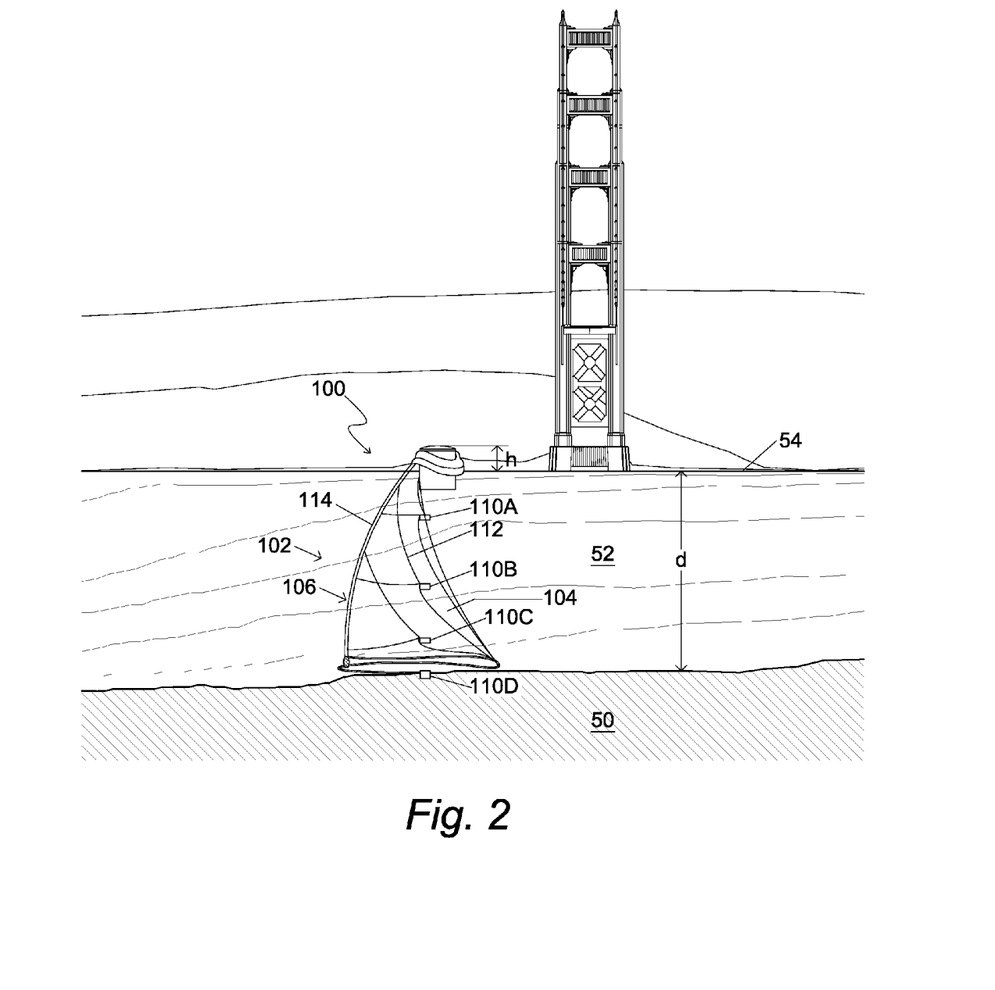
FIG. 2 is a side view of the tidal barrier of FIG. 1, where the tidal barrier is shown in an non-deployed state.
Figure 3A:
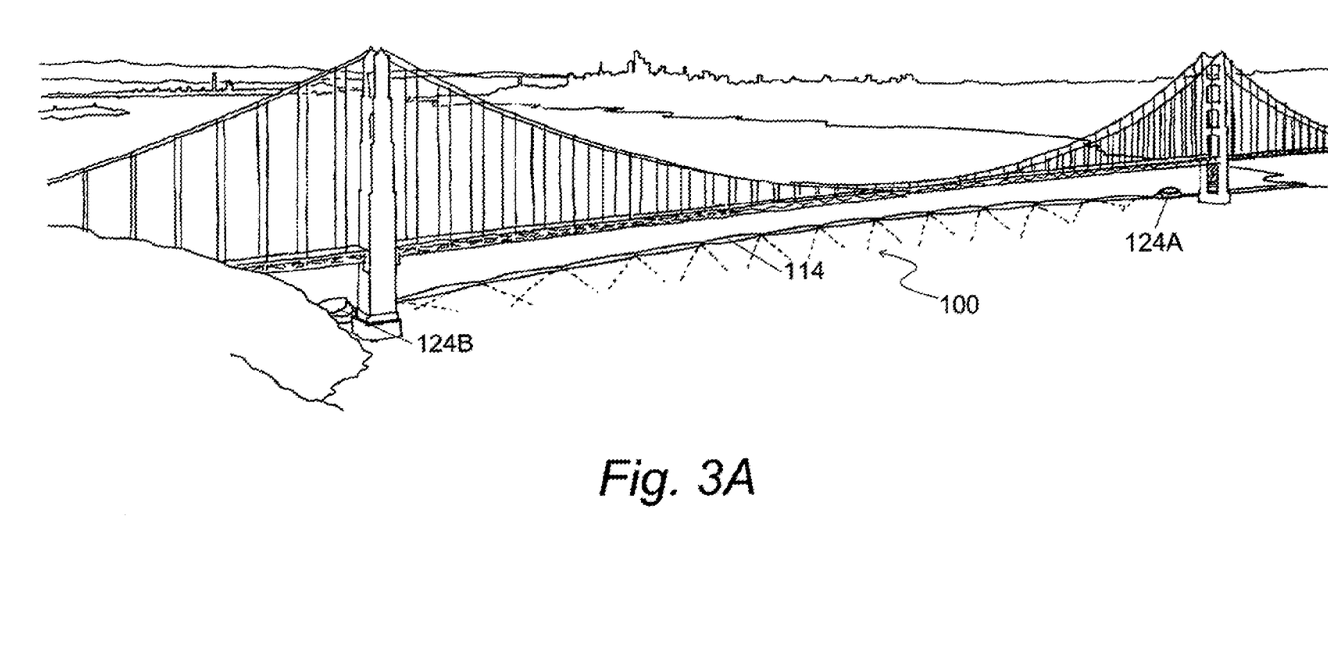
FIG. 3A is a perspective view of the tidal barrier of FIG. 1, where the tidal barrier is shown in a deployed state.
Figure 3B:
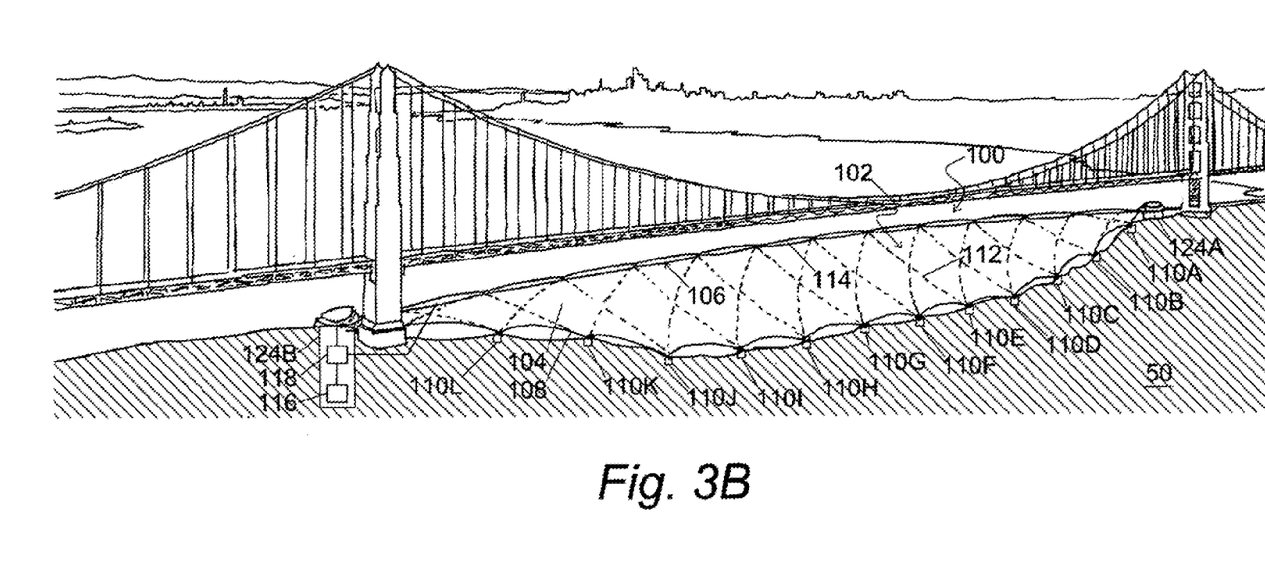
FIG. 3B is another perspective view of the tidal barrier as depicted in FIG. 1, where the high-strength tensile membrane of the tidal barrier is shown in the deployed state in accordance with the present invention, extending between the seabed and the surface of the body of water.
Figure 4:
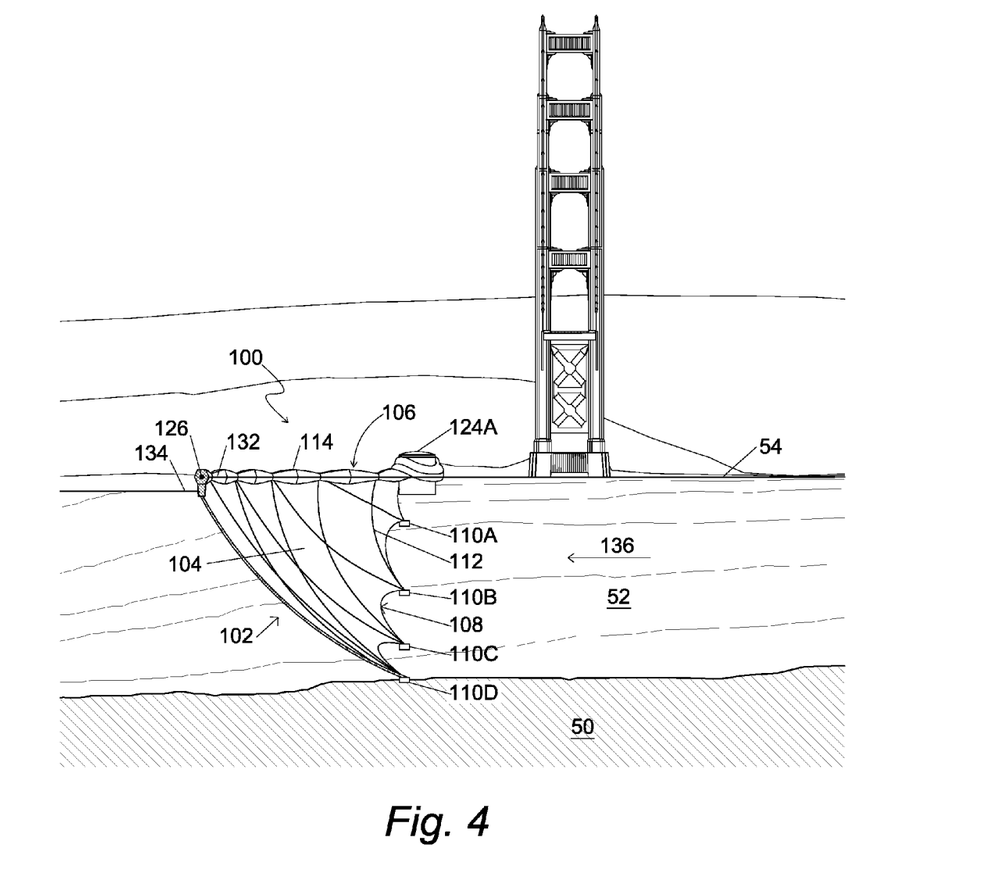
FIG. 4 is a side view of the tidal barrier of FIG. 1, where the tidal barrier is shown in a deployed state.
Figure 5:
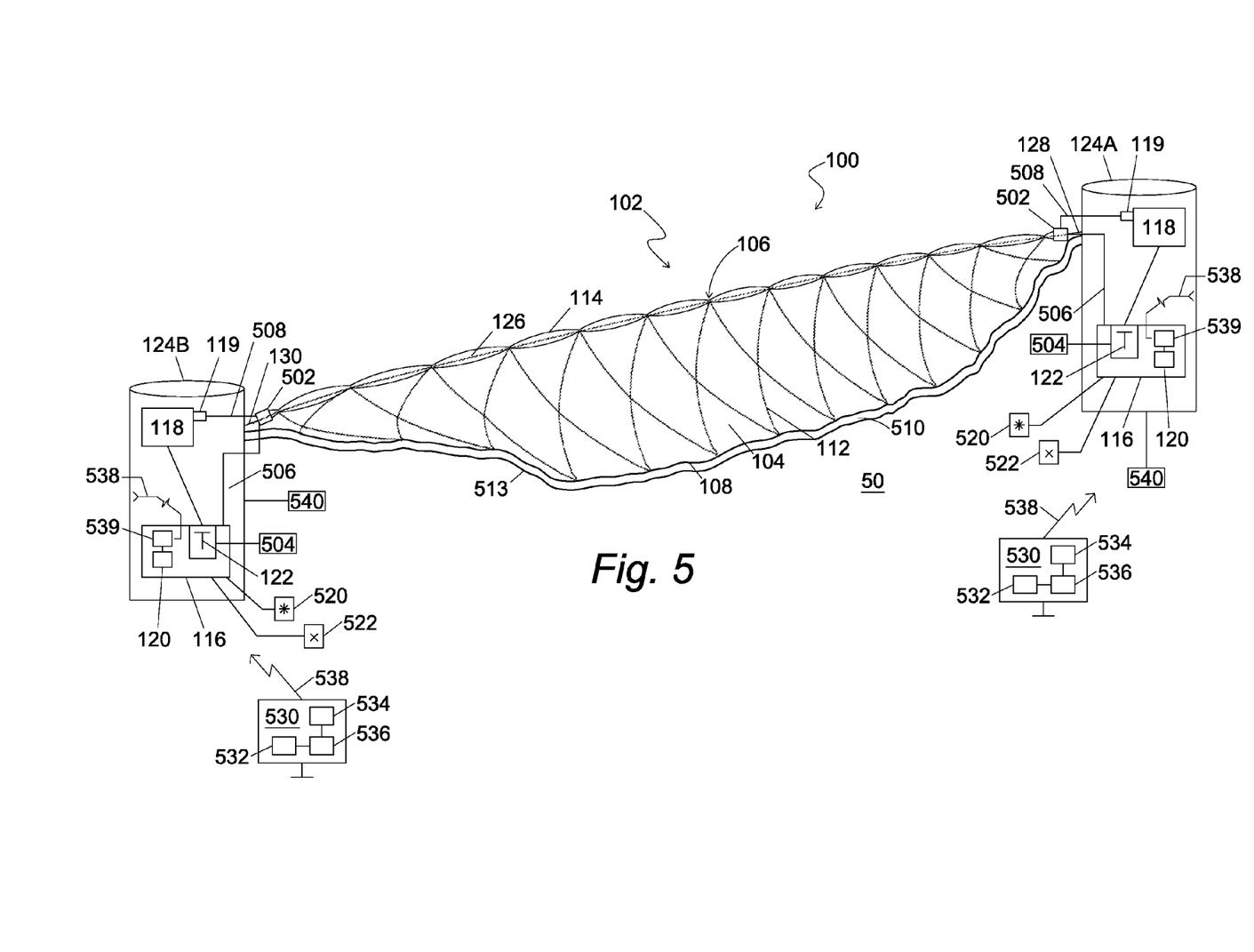
FIG. 5 is a functional block diagram of the tidal barrier of FIG. 1, illustrating a bladder embedded in the tensile membrane in fluid communication with a tank and a pump of the tidal barrier in accordance with the present invention.

FIGS. 1 and 2 depict an exemplary tidal barrier 100 consistent with the present invention, where the tidal barrier 100 is shown in an non-deployed state in which the tidal barrier rests on the seabed 50. FIGS. 3 and 4 depict the tidal barrier 100 in a deployed state, in which the tidal barrier 100 is triggered to rise from the seabed 50 in response to a threat of a tidal surge to function as a temporary dam and inhibit the rise in water level associated from the tidal surge from passing beyond the tidal barrier 100 to protect shoreline or urbanized areas bordering along the shoreline. FIG. 5 depicts a functional block diagram of the components of the tidal barrier 100 utilized to deploy a tidal barrier net 102 with a tensile membrane 104 for protecting a respective shoreline and structures on the shoreline from a tidal change or surge. Although FIGS. 1-5 depict the tidal barrier 100 as being selectively deployed to span across an inland waterway exposed to the ocean and tidal changes from the ocean, a tidal barrier 100 consistent with the present invention may be installed along other waterways such as across rivers to protect inland shorelines and structures along the inland shorelines.

Figure 6A:
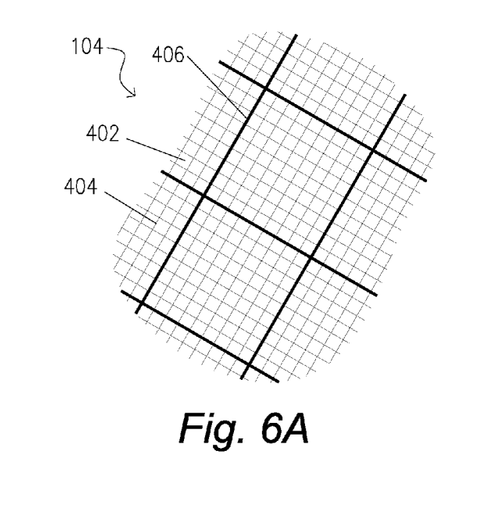
FIG. 6A is an enlarged view of a cut-away portion of the tensile membrane of the tidal barrier shown in FIG. 5, illustrating one exemplary structure and material composition of the tensile membrane consistent with the present invention.
Figure 6B:
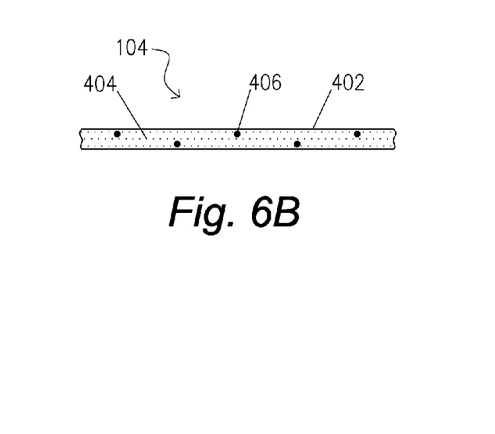
FIG. 6B is a cross-sectional view of the tensile membrane portion shown in FIG. 6A.

As shown in FIGS. 1-5, the tidal barrier 100 includes a net 102 having a tensile membrane 104. The tensile membrane 104 is comprised of a material having a tensile strength equal to or greater than 270 ksi (1865 MPa) to provide resistance to forces from tidal changes or surges as explained in further detail herein. The tensile membrane material may be recycled rubber or plastic strengthened with steel chords, carbon fiber, high-strength Teflon-coated fabric (e.g., a fabric coated with a synthetic fluorine containing resins or polytetrafluoroethylene to prevent sticking), fabric including polyethylene terephthalate threads coated with polyvinyl chloride and the like. The tension membrane is reinforced with high-strength stainless steel or carbon fiber cables. All tensile membrane and reinforcing members are corrosion resistant. As shown in the implementation of the tensile membrane 104 depicted in FIGS. 6A and 6B, the tensile net membrane 104 may comprise a solid sheet or woven threads 402 of recycled rubber or plastic impregnated with or interwoven with stainless steel wires 404. In this implementation, high strength stainless steel cables 406 (having a greater diameter and tensile strength than the individual stainless steel wires 404) are also embedded in the solid sheet or woven threads 402 of recycled rubber or plastic as shown in FIG. 6B to further reinforce the tensile membrane 104. The stainless steel wires 404 and the cables 406 may be interwoven in a grid pattern within the sheet or threads 402 of rubber or plastic material of the tensile membrane 104 as shown in FIG. 6A, where the grid pattern extends the width and length (or to the edges) of the tensile membrane 104.

The tensile membrane 104 has an upper edge 106 and a lower edge 108. The lower edge 108 has a plurality of anchor points 110A-110L for affixing the lower edge 108 to a seabed 50 below a body of water 52. Anchors may include pile foundations driven into the seabed floor, grouted high-strength cable ground anchors, heavy concrete ballasts, and the like. In the side views of the tidal barrier shown in FIGS. 2 and 4, a portion of the net 102 and the anchors 110A, 110B and 110C are shown through the body of water 52 that would otherwise obscure these components of the tidal barrier 100.

The net 102 may also include interior cables 112 (that are in addition to or correspond to the cables 406 embedded in the tensile membrane 104) extending between the lower edge 108 and the upper edge 106 of the tensile membrane 104 so that the interior cables 112 reinforce the tensile membrane 104 when the tidal barrier is deployed as described herein.

Figure 6C:
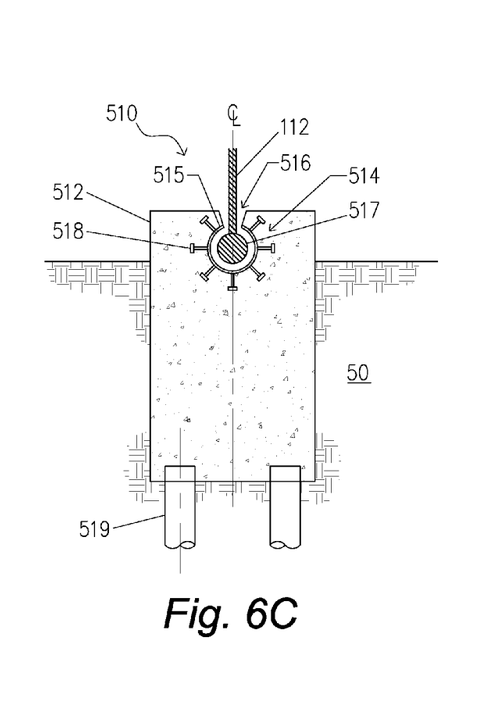
FIG. 6C depicts a cross-sectional view of a continuous reinforced concrete footing that may be placed along the seabed to anchor and substantially seal the lower edge of the tensile membrane shown in FIG. 5 along the sea bed floor.

In an alternative implementation shown in FIG. 6C, the tensile membrane 104 with lower edge 108 may be continuously anchored to the seabed with a continuous reinforced concrete footing system 510. The reinforced concrete footing system 510 includes a reinforced concrete footing 512 that is formed in a continuous line (513 in FIG. 5) along the seabed 50, where the line 513 defines the position of the lower edge of the tensile membrane 104. The reinforced concrete footing system 510 further includes a plurality of corrosion-resistant ball and socket joints 514 embedded within the footing 512, where each socket 515 of each joint 514 defines a respective portion of an opening 516 in the footing 512 and the openings collectively form a channel or continuous opening 516 along the length of the footing 512. The ball 517 retained in the socket 515 of a respective joint 514 is affixed to the lower end of one or more of the interior cables 112 in the tensile membrane 104 such that the lower edge 108 of the tensile membrane is disposed within the channel or continuous opening 516 in the footing 512 such that the lower edge 108 of the tensile membrane 104 is substantially sealed to the footing 512 inhibiting water from passing beneath the lower edge 108 of the tensile membrane 104. The ball and socket joints 514 in cooperation with the continuous channel or opening 516 enable multi-directional movement of the interior cables 112 and the tensile membrane 104. Shear studs 518 may be affixed to each socket 515 to further reinforce the anchoring of the socket 515 (and, thus the respective ball and socket joint 514) within the concrete material comprising the footing 512. Pile foundations 519 may be used to support and anchor the continuous reinforced concrete footing 512 to the sea bed 50.

As shown in FIGS. 2, 3A, 3B, 4, 5 and 6D, the net 102 further includes a bladder 114 affixed to the upper edge 106 of the tensile membrane 104. In FIG. 1B, the tidal barrier 100 is in a non-deployed state in which the upper edge 106 and the deflated bladder 114 is blocked from view by the tensile membrane 104 resting on the seabed 50. The bladder may be comprised of rubber, polyethylene, or other material that may be inflated to hold a predetermined volume of air or gas. The bladder 114 has a valve (502 in FIGS. 5 and 6D) for selectively inflating and deflating the bladder 114. The bladder 114 has a sufficient volume to cause the upper edge 106 of the membrane to rise to a surface 54 of the body of water 52 when the volume of the bladder 114 is inflated with air or other gas.

To deploy the tensile membrane 104, the tidal barrier 100 may include a pump 116 (as shown in FIG. 5) disposed in proximity to the tensile membrane 104 and in fluid communication with the valve 502 of the bladder 114 so that the pump 116 may inflate and deflate the bladder 114, either directly or indirectly through a storage tank 118. The pump 116 may have a controller 120 operatively configured to prompt a piston 122 in the pump 116 to compress air or other gas to inflate the bladder 114. The pump may also include a floatation device 504 disposed in the body of water 52 and connected to the piston 122 such that the floatation device 504 actuates the piston 122 in response to daily tidal changes in the level of the body of water 52.

As shown in FIG. 5, a measurement buoy tank 530 may be placed at sea and anchored to stay afloat at a predetermined area of the sea to monitor high tidal levels. The measurement buoy tank 530 may include a tidal elevation barometer or sensor 532 operatively configured to sense and output a sea elevation or tidal level change. The measurement buoy tank 530 may further include a wireless transmitter 534 and a controller 536 operatively connected to the sensor 532 and the wireless transmitter 534. The controller 536 is programmed via software (e.g., a CPU running a program stored in a memory device of the controller) or hardware logic circuits (e.g., via a commercially available Application Specific Circuit (ASIC) device or programmable logic circuit (PAL)) to: (1) receive the sea elevation or tidal level change output from the sensor 532, (2) determine whether the output exceeds a predetermined threshold, and (3) transmit an alarm signal 538, via the wireless transmitter 534, when the predetermined threshold is exceeded. In this implementation, the pump 116 includes a wireless receiver 539 that is operatively configured to receive the alarm signal 538 from the transmitter 532 and output a corresponding alarm signal to the pump controller 120. In response to receiving the corresponding alarm signal, the pump controller 120 activates the pump 116 to deploy the tidal barrier 100 and activates a marine vessel warning system 540 to signal immanent deployment of the tidal barrier 100.

The valve 502 of the bladder 114 may have a control input 506 for controlling the opening of the valve 502. The pump controller 120 may be operatively connected to the control input 506 to open the valve 502 to deflate the bladder 114 in response to an input signal reflecting that a threat of a tidal change in the body of water has passed. When the bladder is deflated at least a portion of the upper edge 106 of the tensile membrane 104 drops to rest on the seabed 50 as shown in FIGS. 1 and 2.

When a storage tank 118 is employed in the tidal barrier 100, the tank 118 is disposed so that the tank 118 is in fluid communication between the pump 116 and the valve 502 of the bladder 114 as shown in FIG. 5. In this implementation, the pump 116 is adapted to pump an amount of air or other gas for inflating the bladder 114 into the tank 118 for storage. The tank has an output valve 119 adapted to release the stored amount of gas in the tank 118 to the bladder 114 in response to an input from the pump controller 120 or manual lever (not shown in figures) so that the volume of the bladder 114 is filled faster than if air were pumped by the pump 116. For example, a tank 118 storing compressed air in an amount to fill the bladder 114 to its maximum volume may have a valve 119 that when opened releases all the compressed air in the tank to fill the bladder 114 nearly instantaneously and the upper edge 106 of the tensile membrane 104 rises to the surface 54 of the body of water 52 quickly thereafter (e.g., in less than ten minutes). Thus, a tidal barrier 100 consistent with the present invention is adapted to be deployed quickly in response to a threat of a tidal change or surge in the body of water 52.

In one implementation, the bladder 114 is embedded in and along the upper edge of the tensile membrane 104. In this implementation as shown in FIG. 5, the tensile membrane 104 defines a gas passage or flexible piping 508 between the valve 502 of the bladder 114 and the tank 118 or pump 116 used to inflate and deflate the bladder 114.

As shown in the figures, the bladder 114 may be one of a plurality of bladders 114, each of which is affixed along the upper edge 106 of the tensile membrane 104. Each of the bladders 114 may have a respective valve 502 connected in series via the passage 508 or flexible piping to the pump 116 or tank 118. Each bladder 114 has a respective volume to collectively cause the upper edge 106 of the tensile membrane 104 to rise to a surface 54 of the body of water 52 when the volume of each bladder 114 is inflated with air or other gas via the pump 116 and/or the tank 118. In this implementation, the pump controller 120 is operatively configured to prompt the pump piston 122 to inflate and deflate each bladder 114 with air or other gas.

Figure 6D:
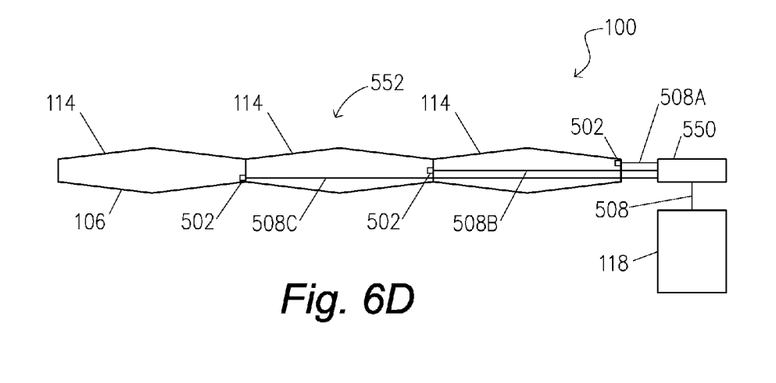
FIG. 6D is a block diagram of one embodiment of a bladder system that may be employed in or attached to the tensile membrane in FIG. 5 in accordance with the present invention, where the bladder system includes a plurality of bladders connected to a manifold that is in fluid communication with a storage tank of the tidal barrier for simultaneously inflating the bladders.

In an alternative implementation as shown in FIG. 6D, the valve 502 of each bladder 114 may be connected in parallel fluid communication with the pump 116 and/or the tank 118 via a separate passage or flexible piping 508. In this implementation, each of the bladders 114 may be inflated and deflated faster than when connected in series to the pump 116 and/or the tank 118. In the implementation shown in FIG. 6D, a manifold 550 is employed in the tidal barrier 100 to increase the speed of deployment of the tensile membrane 104 of the tidal barrier 100 through efficient deployment of air or other gas into individual bladders 114 that collectively comprise a bladder system 552. The manifold 550 connects to the storage tank 118 with a single flexible pipe 508 with air or other gas distribution made directly to bladders 114 by way of individual flexible piping 508a-508c connected to each bladder 114. In this implementation, air or other gas stored in the storage tank 118 may be effectively distributed simultaneously to the bladders 114 via the manifold 550 to inflate the bladders 114 and subsequently deploy the tensile membrane 104.

Pump 116 may be electrically connected to and powered by renewable energy sources such as a solar generator 520, a wind turbine 522, and the like. Such renewable energy sources may be disposed at or above the surface of the body of water where the tidal barrier is disposed.

Figure 7:
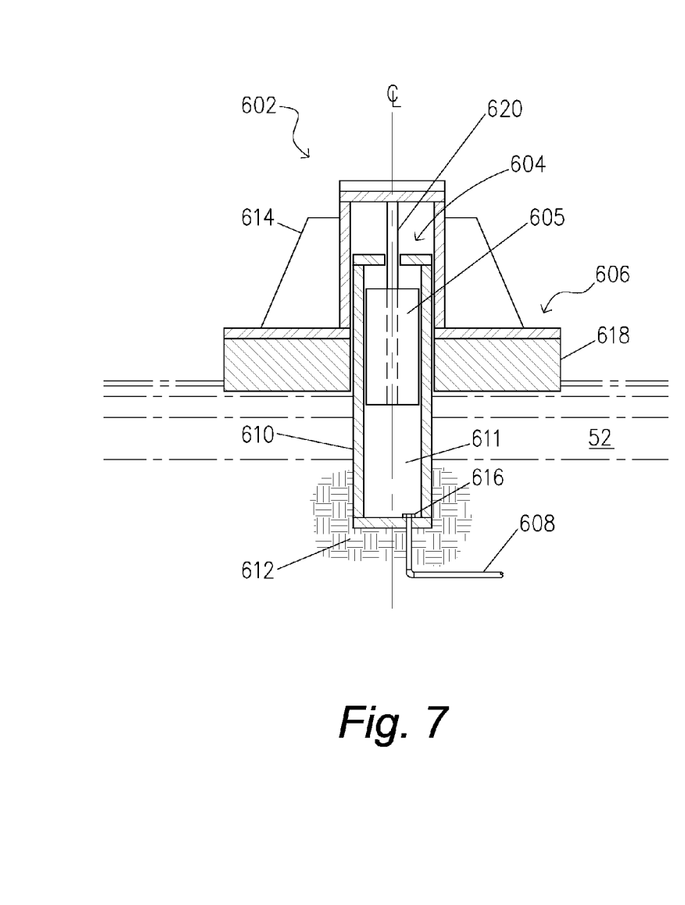
FIG. 7 depicts a pneumatic piston actuator that may be employed as the pump in the tidal barrier to compress air or other gas for inflating the bladder in or attached to the tensile membrane to deploy the tidal barrier.

FIG. 7 depicts an exemplary pneumatic piston actuator 602 that may be employed as the pump 116 in the tidal barrier 100 to compress air or other gas for inflating the bladder 114 in or attached to the tensile membrane 104 to deploy the tidal barrier. The actuator 602 is comprised of a pneumatic piston 604 connected to a floatation system 606 that fluctuates up and down in response to wave action in the body of water 52 where the actuator 602 is disposed. The floatation system 606 includes a floatation assembly 618 that floats on the surface of the water 52, and a corrosion resistant steel structure 614 that directly connects the permanent floatation assembly 618 to the pneumatic piston 604 used to compress the air or other gas. A stationary corrosion-resistant steel cylinder 610 is employed in the actuator 602 to house the head 605 of the piston 604 and contain the compressed air or other gas in the interior 611 of the cylinder resulting from the actuation of the piston 604 via the flotation assembly 618. The cylinder 610 is anchored to the sea bed via a permanent foundation system 612, which may comprise foundation piles or the like. A value 616 connects the interior 611 of the cylinder 610 to a pipe 608 that connects to the storage tank 118 employed in the tidal barrier 100 for dispensing the compressed air or gas to the bladder 114 as further described herein. As shown in FIG. 7, the floatation assembly 618 may surround or be disposed on one side of the cylinder 610 and connect to a shaft 620 of the piston 604 that extends out of one end of the cylinder 610. In this implementation, when wave action in the body of water 52 occurs, the floatation assembly 618 actuates the piston 604 within the cylinder 610 to compress air or other gas (that may be introduced into the cylinder from the surrounding atmosphere via an inlet in the cylinder through which the shaft extends) such that the compressed air or gas is discharged through the valve 616 and the pipe 608 to the storage tank 118.

Figure 8:
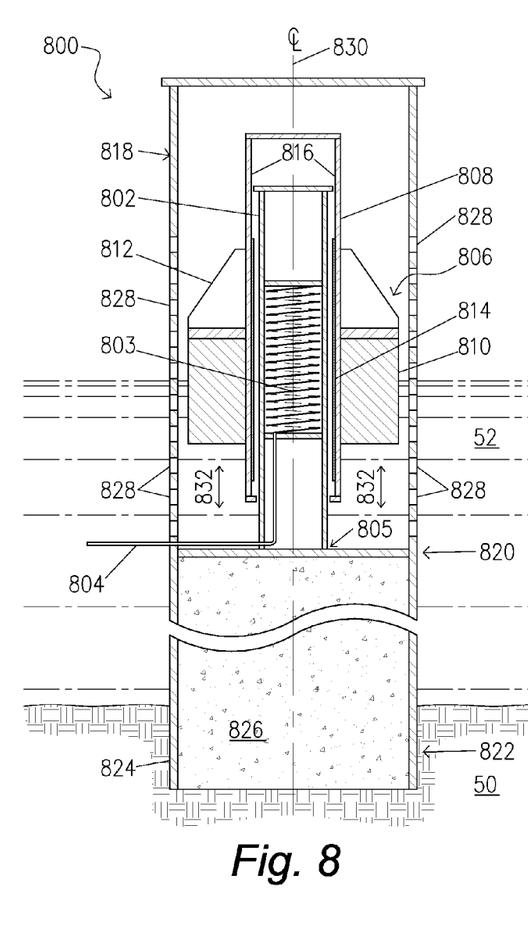
FIG. 8 depicts an electromagnetic floatation generator that may be employed as a device that provides electricity to a pump that compresses air or other gas for inflating the bladder in or attached to the tensile membrane to deploy the tidal barrier.

FIG. 8 depicts an exemplary electromagnetic floatation generator 800 that may be used to provide power to the pump 116 in the tidal barrier 100 to compress air or other gas for inflating the bladder 114 in or attached to the tensile membrane 104. Although the electromagnetic floatation generator 800 is described as producing power for the pump 116, the generator 800 may be employed to provide power to other electrical components of the tidal barrier 100 or other device. The electromagnetic floatation generator 800 includes an internal chamber 802 comprised of a corrosion-resistant material (such as stainless steel) and houses a conductive coil 803 comprised of a metal or metal alloy (such as copper or steel). A cable or wire 804 electrically connects the coil 803 to the power supply or input of the pump 116 (not shown in FIG. 8).

One end 805 of the internal chamber 802 is anchored to the seabed 50 via a concrete pile or attachment to a housing structure for the generator 800 as explained in further detail herein.

The electromagnetic floatation generator 800 further includes a floatation system 806 and an external chamber 808 that is connected to the floatation system 806 such that the floatation system 806 causes the external chamber 808 to fluctuate up and down in response to wave action in the body of water 52 where the generator 800 is disposed. The external chamber 808 is comprised of steel or other corrosion-resistant material. The floatation system 806 includes a floatation assembly 810 that floats on the surface 54 of the water 52, and a structure 812 comprised of a corrosion-resistant material that directly connects the floatation assembly 810 to the external chamber 808. The floatation assembly 810 may surround or be disposed on one side of the external chamber 808.

As shown in FIG. 8, one or more permanent magnets 814 are disposed on one or more interior walls 816 of the external chamber 808. The external chamber 808 encases or encloses and moves relative to at least a portion of the internal chamber 802 housing the coil 803 so that the magnets 814 are cyclically positioned relative to the coil 803. Although the coil 803 is actually stationary as the internal chamber 802 is anchored to the seabed, at least a portion of the coil 803 effectively moves within or in and out of a magnetic field produced by the magnets 814 as the external chamber 808 (and, thus, the magnetic field) fluctuates up and down in response to wave action in the body of water 52.

The movement of the coil 803 within or in and out the magnetic field generates a corresponding A/C electrical current in the coil 803 that flows out of the cable 804 to provide electricity for powering the pump. Although the cable 804 is shown in FIG. 8 as being connected to one end of the coil 804, one wire in the cable 804 may be connected to the one end of the coil 804 and another wire in the cable 804 may be connected to the other end of the coil 804 so that both wires in the cable 804 connected to ends of the coil 804 may be electrically connected to the power supply or power inputs of the pump 116 to complete an A/C power circuit.

In one implementation, the electromagnetic floatation generator 800 includes a housing 818 comprised of stainless steel or other corrosion-resistant material. The housing 818 encases the internal chamber 802, the external chamber 808 and the floatation system 806. One end 820 of the housing 818 is anchored to the sea bed 50 via a permanent foundation system 822 comprised of a steel casing 824 embedded in the seabed 50 with concrete 826 filling the casing 824 to further anchor the casing 824 and, thus, the generator 800 to the sea bed 50. In this implementation, the one end 805 of the internal chamber 802 is affixed to the housing 818 or the casing 822. The housing 818 is perforated with one or more openings 828 allowing water to flow into the housing so that the elevation of the water 50 within the housing changes with wave action resulting in the up and down movement of the floatation system 806 and the external chamber 808 with the magnets 814 along a central axis 830 of the internal chamber 802 as referenced by the directional arrow 832 in FIG. 8. The housing 818 may incorporate or be part of the larger pylon end anchors 124A and 124B for the tidal barrier 100. Multiple electromagnetic floatation generators 800 and steel foundation casings 822 may be employed in each pylon 124A and 124B. Each housing 818 and foundation casing 822 used to anchor the housing 818 are constructed of steel or other high-strength material of sufficient thickness so the electromagnetic floatation generator 800 is adapted to resist lateral wave action and forces due to the placement of the generator 800 in shallow water areas 52.

Returning to FIGS. 1-5, the tidal barrier 100 may also include a plurality of pylons 124A-124B each anchored relative to the seabed 50 and extending a predetermined height (h) above the surface 54 of the body of water 52 when the body of water is at a predetermined depth (d) as reflected in FIG. 2. For example, the predetermined height (d) may be derived based on historical average depth of the body of water 52 and the predetermined height (h) may be derived based on the average increase in the depth of the body of water 52 based on previous or predicted tidal changes or surges.

In the implementation shown in FIGS. 1-5, two pylons 124A and 124B are employed and are disposed on opposing sides of the body of water 52 near the water's edge or shoreline. In this implementation, the net 102 includes a top cable 126 affixed to and running a length of the upper edge 106 of the tensile membrane 104 as best shown in FIGS. 3-4. The top cable 126 has one end 128 attached or anchored to one pylon 124A and another end 130 attached or anchored to the other pylon 125B so that, when the volume of the bladder 114 (or bladders) is inflated and the upper edge of the membrane 104 is correspondingly caused to rise to the surface 54 of the body of water 52, the upper edge 106 of the tensile membrane 104 extends from the one pylon 124A to other pylon 124B in an arc defined by a current of the body of water 52 (e.g., associated with a tidal change or surge) as shown in FIGS. 3 and 4. When the tidal barrier is deployed as described herein and the water level of the body of water on one side 132 of the net 102 rises with the tidal current as shown in FIGS. 3-4, the upper edge 106 of the tensile membrane 104 correspondingly rises causing the tensile membrane to form a catenary arc in the direction of the tidal current (reflected by reference arrow 136 in FIG. 4) such that the rise in water level is inhibited from passing beyond the one side 132 of the net to the other side 134. In the event that the tidal change or surge causes a rise in the water level depth (d) beyond the predetermined height (h) of the pylons 124A and 124B resulting in a peak, the deployed tensile membrane 104 of the tidal barrier 100 will still "shave off" the peak into the inland waterway on the other side 134 of the net 102.

The principal forces on the tensile membrane 104 result from drag during deployment of the net 102 and the tensile membrane 104 as well as the hydrostatic imbalance due to the differential water level (as best shown in FIG. 4) between the one side 132 of the net 102 from which the tidal change or surge is received (e.g., ocean side) and the other side 134 associated with the body of water in the inland waterway which shores the tidal barrier 100 protects from the tidal change or surge. The resulting catenary arc (see FIGS. 3-5) is a direct response to these applied forces. The curvature of the net 102 and the tensile membrane 104 is derived from the inland waterway entrance depth (d) at the time when the tidal change or surge is received at the net 102 and the location of the pylons 124A and 124B. Dredging may be required to achieve the optimal drape of the net 102 and the tensile membrane 104 for resistance to the tidal change or surge resulting in maximum resistance to load with the least structural materials required for the net 102 and the tensile membrane 104.

Accordingly, when sensors (not shown in the figures) indicate the approach of a threat-level tidal surge, the tidal barrier 100 may be deployed so that one or more bladders 114 are inflated (via the pump 116 or the tank 118), the upper edge 106 of the tensile membrane 104 subsequently rises to the surface 54 of the body of water 52, and the tensile membrane 104 is stretched in a catenary arc from the water's edge (e.g., between pylons 124A and 14B) to the seabed 52. When the tidal change or surge has subsided and the tidal barrier 100 is no longer needed, the bladder 114 is deflated (e.g., via the pump controller 120) and the tensile membrane 104 (or at least a middle portion thereof) sinks and rests on the seabed 50.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A tidal barrier, comprising:
a net having a tensile membrane, the tensile membrane having an upper edge and a lower edge, the lower edge having a plurality of anchor points for affixing the lower edge to a seabed below a body of water;
a bladder affixed to the upper edge and having a valve for selectively inflating and deflating the bladder, the bladder having a sufficient volume to cause the upper edge of the membrane to rise to a surface of the body of water when the volume is inflated with a gas;
a pump disposed in proximity to the tensile membrane and in fluid communication with the valve of the bladder, the pump having a controller for selectively prompting the pump to inflate and deflate the bladder with the gas, and
a tank in fluid communication between the pump and the valve of the bladder, wherein pump is adapted to pump an amount of gas for inflating the volume of the bladder into the tank for storage, and the tank has an output valve adapted to release the stored amount of gas to the bladder in response to an input.

2. The tidal barrier of claim 1, wherein the tensile membrane comprises a material having a tensile strength equal to or greater than 270 ksi (1865 MPa).

3. The tidal barrier of claim 1, wherein the tensile membrane comprises a material formed from rubber strengthened with steel cables, plastic strengthened with steel cables, carbon fiber, or a fabric including polyethylene terephthal ate threads coated with polyvinyl chloride.

4. The tidal barrier of claim 1, wherein the net further comprises a plurality of interior cables that extend between the lower edge and the upper edge of the tensile membrane so that the interior cables reinforce the tensile strength of the tensile membrane when the volume of the bladder is inflated and the upper edge of the membrane is correspondingly caused to rise to the surface of the body of water.

5. The tidal barrier of claim 1, wherein the bladder is embedded in the tensile membrane along the upper edge.

6. The tidal barrier of claim 1, wherein the tensile membrane defines a gas passage between the valve of the bladder and the pump.

7. The tidal barrier of claim 1, wherein the bladder is one of a plurality of bladders, each affixed along the upper edge of the tensile membrane and having a valve for selectively inflating and deflating the respective bladder, each bladder having a respective volume to collectively cause the upper edge of the membrane to rise to a surface of the body of water when the volume of each bladder is inflated with a gas;

8. The tidal barrier of claim 7, wherein the pump is in fluid communication with the valve of each bladder, the pump having a controller for selectively prompting the pump to inflate and deflate each bladder with the gas.

9. The tidal barrier of claim 1, further comprising:
a plurality of pylons, each anchored relative to the seabed and extending a predetermined height above the surface of the body of water when the body of water is at a predetermined depth,
wherein the net further comprises a top cable affixed to and running a length of the upper edge of the tensile membrane, the top cable having one end attached to one pylon and another end attached to another pylon so that, when the volume of the bladder is inflated and the upper edge of the membrane is correspondingly caused to rise to the surface of the body of water, the upper edge of the tensile membrane extends from the one pylon to other pylon in an arc defined by a current of the body of water.

10. The tidal barrier of claim 9, wherein, when the water level of the body of water on one side of the net rises with the current, the upper edge of the tensile membrane correspondingly rises causing the tensile membrane to form a catenary arc in the direction of the current such that the rise in water level is inhibited from passing beyond the one side of the net.

11. The tidal barrier of claim 1, wherein the pump includes a piston adapted to compress air as the gas to the tank when the piston is actuated and a floatation device disposed in the body of water and connected to the piston such that the floatation device actuates the piston in response to tidal changes in the level of the body of water.

12. The tidal barrier of claim 1, wherein the valve of the bladder has a control input for controlling the opening of the valve, and the pump controller is operatively connected to the control input to open the valve to deflate the bladder in response to an input signal reflecting that a threat of a tidal change in the body of water has passed.

13. The tidal barrier of claim 1, wherein, when the bladder is deflated at least a portion of the upper edge of the tensile membrane drops to rest on the seabed.

14. The tidal barrier of claim 1, wherein the bladder is one of a plurality of bladders, each affixed along the upper edge of the tensile membrane, each bladder having a respective volume to collectively cause the upper edge of the membrane to rise to a surface of the body of water when the volume of each bladder is inflated with a gas, and the tidal barrier further comprises:
a manifold having an input and a plurality of outputs, each manifold output being in fluid communication with a respective one of the bladders;
a tank in fluid communication between the pump and the manifold input, wherein the pump is adapted to pump an amount of gas for inflating the volume of each bladder into the tank for storage, and the tank has an output valve adapted to release the stored amount of gas to the bladders via the manifold in response to an input.

15. The tidal barrier of claim 14, wherein the pump includes a wireless receiver that is operatively configured to receive the alarm signal from the transmitter and output a corresponding alarm signal to the pump controller, and, in response to receiving the corresponding alarm signal, the pump controller activates the pump to inflate the bladder.

16. The tidal barrier of claim 1, further comprising:
a measurement buoy tank operatively configured to float on the surface of the water at a predetermined distance from the tidal barrier net, the measurement buoy tank including:
a tidal elevation sensor operatively configured to sense and output a tidal level change;
a wireless transmitter; and
a controller operatively connected to the sensor and the wireless transmitter and programmed to receive the tidal level change output from the sensor 532, determine whether the output exceeds a predetermined threshold, and transmit an alarm signal, via the wireless transmitter 534, when the predetermined threshold is exceeded.

17. The tidal barrier of claim 1, further comprising a continuous concrete footing system disposed along the seabed, the footing system anchoring and substantially sealing the lower edge of the tensile membrane along the sea bed.

18. The tidal barrier of claim 17, wherein:
the net further comprises a plurality of interior cables that extend between the lower edge and the upper edge of the tensile membrane so that the interior cables reinforce the tensile strength of the tensile membrane when the volume of the bladder is inflated and the upper edge of the membrane is correspondingly caused to rise to the surface of the body of water;
the concrete footing system includes a concrete footing formed along the seabed and a plurality of ball and socket joints embedded within the footing,
each socket of each joint defines a respective portion of a continuous opening in the footing and the continuous opening running along a length of the footing,
the ball retained in the socket of each joint is affixed to a lower end of a respective one of the interior cables such that the lower edge of the tensile membrane is disposed within the continuous opening in the footing.

19. The tidal barrier of claim 1, further comprising one of a solar generator and a wind turbine electrically connected to the pump to power the pump.

20. The tidal barrier of claim 1, further comprising an electromagnetic floatation generator for powering the pump, the electromagnetic floatation generator including:
an internal chamber housing a conductive coil having an end electrically connected to the pump, the internal chamber having one end anchored to the seabed;
a floatation system having a floatation assembly that floats on the surface of the body of water;
an external chamber connected to the floatation system such that the floatation system causes the external chamber to fluctuate up and down in response to wave action in the body of water where the generator is disposed; and
a permanent magnet disposed on an interior wall of the external chamber;
wherein the external chamber encases and moves relative to at least a portion of the internal chamber housing the coil so that at least a portion of the coil effectively moves within a magnetic field produced by the magnet as the external chamber fluctuates up and down in response to wave action in the body of water to generate a current in the coil.

21. The tidal barrier of claim 20, further comprising
a housing encasing the internal chamber, the external chamber and the floatation system, the housing having one end anchored to the sea bed, the housing being perforated to have one or more openings allowing water to flow into the housing so that the elevation of the body of water within the housing changes with wave action resulting in the up and down movement of the floatation system and the external chamber with the magnet along a central axis of the internal chamber.

22. A tidal barrier, comprising:
a net having a tensile membrane, the tensile membrane having an upper edge and a lower edge, the lower edge having a plurality of anchor points for affixing the lower edge to a seabed below a body of water;
a bladder affixed to the upper edge and having a valve for selectively inflating and deflating the bladder, the bladder having a sufficient volume to cause the upper edge of the membrane to rise to a surface of the body of water when the volume is inflated with a gas;
a pump disposed in proximity to the tensile membrane and in fluid communication with the valve of the bladder; and
a tank in fluid communication between the pump and the valve of the bladder, wherein pump is adapted to pump an amount of gas for inflating the volume of the bladder into the tank for storage, and the tank has an output valve adapted to release the stored amount of gas to the bladder in response to an input.

23. A tidal barrier of claim 22 wherein the pump used to inflate the bladder is powered by an electromagnetic floatation generator.

24. The tidal barrier of claim 23 wherein the electromagnetic floatation generator comprises:
an internal chamber housing a conductive coil having an end electrically connected to the pump, the internal chamber having one end anchored to a seabed below a body of water;
a floatation system having a floatation assembly that floats on the surface of the body of water;
an external chamber connected to the floatation system such that the floatation system causes the external chamber to fluctuate up and down in response to wave action in the body of water where the generator is disposed; and
a permanent magnet disposed on an interior wall of the external chamber;
wherein the external chamber encases and moves relative to at least a portion of the internal chamber housing the coil so that at least a portion of the coil effectively moves within a magnetic field produced by the magnet as the external chamber fluctuates up and down in response to wave action in the body of water to generate a current in the coil.

25. The tidal barrier of claim 24 wherein the electromagnetic floatation generator further comprises:
a housing encasing the internal chamber, the external chamber and the floatation system, the housing having one end anchored to the sea bed, the housing being perforated to have one or more openings allowing water to flow into the housing so that the elevation of the body of water within the housing changes with wave action resulting in the up and down movement of the floatation system and the external chamber with the magnet along a central axis of the internal chamber.

* * * * *